(12) United States Patent
Okada et al.

(10) Patent No.: US 8,270,260 B2
(45) Date of Patent: Sep. 18, 2012

(54) OPTICALLY ASSISTED MAGNETIC RECORDING HEAD HAVING A WAVEGUIDE CORE WITH A PLATE-SHAPED PORTION PROTRUDING FROM AN AIR BEARING SURFACE SIDE OF THE CORE

(75) Inventors: Tomohiro Okada, Kanagawa-ken (JP); Hisashi Kimura, Kanagawa-ken (JP); Tutomu Yasuda, Kanagawa-ken (JP); Kimitoshi Etoh, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 236 days.

(21) Appl. No.: 12/636,672

(22) Filed: Dec. 11, 2009

(65) Prior Publication Data

US 2010/0157745 A1 Jun. 24, 2010

(30) Foreign Application Priority Data

Dec. 19, 2008 (JP) ................................. 2008-323529

(51) Int. Cl.
*G11B 11/00* (2006.01)
(52) U.S. Cl. .................. 369/13.33; 369/13.13
(58) Field of Classification Search ............... 369/13.33, 369/13.13, 13.32, 13.02, 112.09, 112.14, 369/112.21, 112.27; 360/59; 395/129, 31, 395/88–94; 250/201.3, 201.5
See application file for complete search history.

(56) References Cited

U.S. PATENT DOCUMENTS

| 2007/0081426 A1* | 4/2007 | Lee et al. | 369/13.33 |
| 2007/0165495 A1* | 7/2007 | Lee et al. | 369/13.33 |
| 2007/0230048 A1* | 10/2007 | Hasegawa | 369/13.33 |
| 2011/0205865 A1* | 8/2011 | Matsushima et al. | 369/13.33 |

FOREIGN PATENT DOCUMENTS

JP 2007-293972 11/2007

* cited by examiner

*Primary Examiner* — Tan X Dinh
(74) *Attorney, Agent, or Firm* — Zilka-Kotab, PC

(57) ABSTRACT

An optically assisted magnetic recording head causes light to be efficiently incident on a near-field light generating element and is thereby capable of efficiently generating near-field light. The optically assisted magnetic recording head, according to one embodiment, has a waveguide and a thin metal film. The waveguide has a core and a clad at least partially surrounding the core and serves as near-field light generating device. The core has a plate-shaped portion that has a small width and protrudes from an edge of the core. The edge of the core is located on the air bearing surface side. The thin metal film is provided on an upper portion and side portions of the plate-shaped portion to cover the edge of the core at the air bearing surface side. Other systems and methods are disclosed as well to achieve efficient incident light on a near-field light generating element.

12 Claims, 6 Drawing Sheets

OPTICALLY ASSISTED MAGNETIC RECORDING HEAD HAVING A WAVEGUIDE CORE WITH A PLATE-SHAPED PORTION PROTRUDING FROM AN AIR BEARING SURFACE SIDE OF THE CORE

RELATED APPLICATIONS

The present application claims priority to a Japanese Patent Application filed Dec. 19, 2008, under Appl. No. 2008-323529, which is incorporated herein by reference.

FIELD OF THE INVENTION

The present invention relates to magnetic recording/reproducing, and more particularly, to a device capable of recording information at high density using an optically assisted magnetic recording head.

BACKGROUND OF THE INVENTION

In recent years, an optically assisted recording scheme has been proposed as a recording scheme for recording data at a density of 1 Tb/in$^2$ or more. In a conventional magnetic recording device, recorded information may be lost due to a heat fluctuation when a recording density is equal to or more than 1 Tb/in$^2$. In order to avoid this, increases in the coercive force of a magnetic recording medium may be used. However, the intensity of a magnetic field produced by a recording head is limited. If the coercive force is excessively increased, recording bits cannot be formed on the recording medium. To solve this, in current devices the medium is irradiated with light at the moment of recording and thereby heated in the optically assisted recording scheme. Heating the medium reduces the coercive force. Thus, data can be recorded on a medium having a high coercive force. Therefore, a recording density of 1 Tb/in$^2$ or more can be achieved.

The diameter of a spot of light with which a medium is irradiated to heat the medium should be close to the size (several ten nanometers) of a recording bit in an optically assisted recording device. This is because when the diameter of the light spot is larger than the recording bit, information stored in an adjacent track is deleted, e.g., it is written over by the new data or erased by the light reducing the coercive force for that bit. In order to heat such a fine region, near-field light is used. The near-field light is an electromagnetic field (light whose wavenumber has an imaginary component) locally present near a fine object smaller than one light wavelength. The near field is generated by using a metal scatterer or fine opening whose diameter is smaller than the light's wavelength. Japanese Patent Office (JPO) Pub. No. JP-A-2007-293972 describes an element that has a narrowed portion made of metal and generates near-field light by irradiating the narrowed portion with laser light.

In order to efficiently generate near-field light, the laser light should be effectively incident on a near-field light generating element such as a fine opening or a metal scatterer. This is because when the diameter of a spot of the incident light is much larger than the size of the fine opening or metal scatterer, a large part of the incident light is not incident on the near-field light generating element and passes through the near-field light generating element. This portion of the light is not transferred to the recording medium at the point desired and results in energy loss and a reduction in the efficiency of the near-field light source.

Therefore, it would be beneficial to optically assisted magnetic recording heads to have a system which causes light to be efficiently incident on a near-field light generating element and thereby more efficiently generates near-field light than conventional systems can due to the problems described previously.

SUMMARY OF THE INVENTION

In one embodiment, an optically assisted magnetic recording head includes a recording pole for producing a recording magnetic field and a near-field light generating device having a waveguide and a thin metal film. The waveguide has a core and a clad at least partially surrounding the core, which has a plate-shaped portion having a small width which protrudes from an edge of the core, the edge being located on an air bearing surface side of the core. Also, the thin metal film is located on an upper portion and on side portions of the plate-shaped portion such that the thin metal film covers the edge of the core at the air bearing surface side.

In another embodiment, a method for manufacturing an optically assisted magnetic recording head having a near-field light generating device and a recording pole for producing a recording magnetic field includes forming a first inorganic insulating film for a waveguide clad, forming a second inorganic insulating film, etching the second inorganic insulating film to form a waveguide core and a thin protrusion extending from an edge of the waveguide core in a top-bottom direction, the edge of the waveguide core being located on an air bearing surface side, processing the thin protrusion by ion milling such that an upper portion of the thin protrusion is pointed and the thin protrusion has a substantially plate shape and a small width, and plating the upper portion and side portions of the thin protrusion having the plate shape with metal.

According to another embodiment, a magnetic recording and reproducing device includes a magnetic recording medium, a medium driver for driving the magnetic recording medium, at least one magnetic head having a recording head and a reproducing head, and a head driver for moving the at least one magnetic head to a position above the magnetic recording medium. The magnetic recording medium is a perpendicular magnetic recording medium having a soft magnetic backing layer and a perpendicular magnetic recording film, and the recording head has a near-field light generating device and a recording pole for producing a recording magnetic field. Also, the near-field light generating device has a waveguide and a thin metal film, the waveguide having a waveguide core and a waveguide clad at least partially surrounding the waveguide core. Furthermore, the waveguide core has a plate-shaped portion protruding from an edge of the waveguide core having a small width, the edge being located on an air bearing surface side, and the thin metal film is provided on an upper portion and side portions of the plate-shaped portion such that the thin metal film covers the edge of the waveguide core at the air bearing surface side.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIGS. 4(a) to 4(d) are outline diagrams showing a method for forming a waveguide and a near-field light generating element in a slider, according to one embodiment.

FIGS. 7(a) to 7(f) are schematic diagrams showing a process for forming a plating film, according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, an optically assisted magnetic recording head includes a recording pole for producing a recording magnetic field and a near-field light generating device having a waveguide and a thin metal film. The waveguide has a core and a clad at least partially surrounding the core, which has a plate-shaped portion, having a small width which protrudes from an edge of the core, the edge being located on an air bearing surface side of the core. Also, the thin metal film is located on an upper portion and on side portions of the plate-shaped portion such that the thin metal film covers the edge of the core at the air bearing surface side.

In another general embodiment, a method for manufacturing an optically assisted magnetic recording head having a near-field light generating device and a recording pole for producing a recording magnetic field includes forming a first inorganic insulating film for a waveguide clad, forming a second inorganic insulating film, etching the second inorganic insulating film to form a waveguide core and a thin protrusion extending from an edge of the waveguide core in a top-bottom direction, the edge of the waveguide core being located on an air bearing surface side, processing the thin protrusion by ion milling such that an upper portion of the thin protrusion is pointed and the thin protrusion has a substantially plate shape and a small width, and plating the upper portion and side portions of the thin protrusion having the plate shape with metal.

According to another general embodiment, a magnetic recording and reproducing device includes a magnetic recording medium, a medium driver for driving the magnetic recording medium, at least one magnetic head having a recording head and a reproducing head, and a head driver for moving the at least one magnetic head to a position above the magnetic recording medium. The magnetic recording medium is a perpendicular magnetic recording medium having a soft magnetic backing layer and a perpendicular magnetic recording film, and the recording head has a near-field light generating device and a recording pole for producing a recording magnetic field. Also, the near-field light generating device has a waveguide and a thin metal film, the waveguide having a waveguide core and a waveguide clad at least partially surrounding the waveguide core. Furthermore, the waveguide core has a plate-shaped portion protruding from an edge of the waveguide core having a small width, the edge being located on an air bearing surface side, and the thin metal film is provided on an upper portion and side portions of the plate-shaped portion such that the thin metal film covers the edge of the waveguide core at the air bearing surface side.

It is preferable that the plate-shaped portion having the small width be pointed. In addition, it is preferable that the thin metal film be located on a leading side of the recording pole.

The thin metal film may be made of Au, for example, or other suitable material. The thin metal film may have a C shape, or other desirable shape, and preferably sandwiches the plate-shaped portion that has the small width and protrudes from the edge of the core. In one approach, the edge is located on the side of the air bearing surface. The plate-shaped portion may be surrounded by a narrowed portion of the thin metal film. The thin metal film may be irradiated with almost all components of light passing through the waveguide, and near-field light having a high intensity is efficiently generated from the narrowed portion of the thin metal film.

Figure 1:
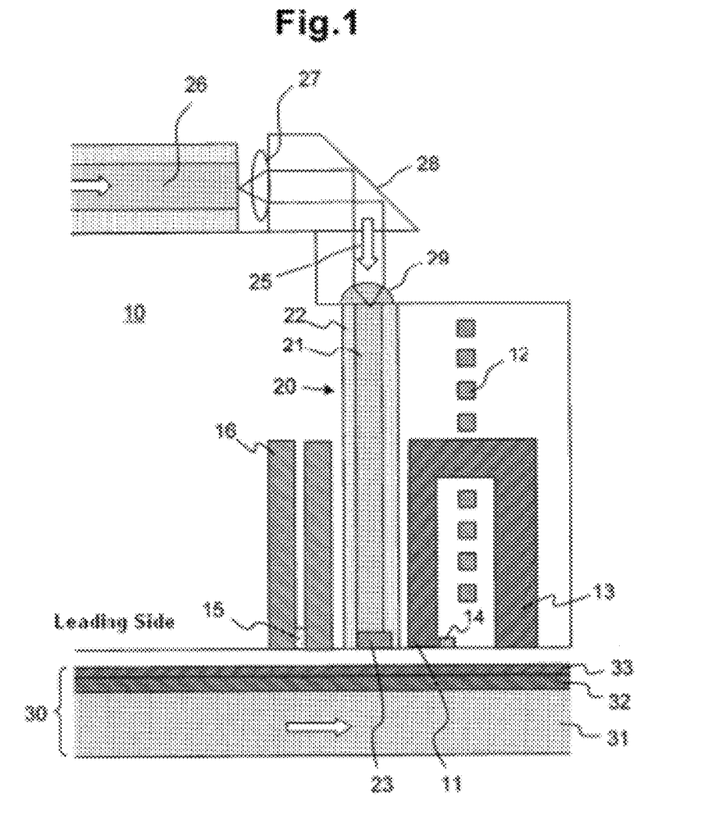
FIG. 1 is a schematic cross sectional view of an example of an optically assisted magnetic recording head according to one embodiment.
Figure 2:
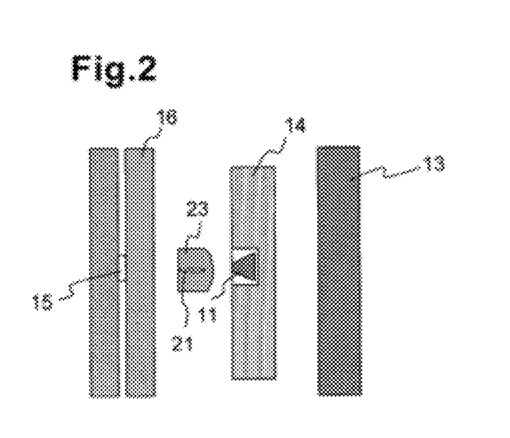
FIG. 2 is a schematic diagram showing an example of the optically assisted magnetic recording head according to one embodiment when viewed from an air bearing surface.

Now referring to FIG. 1, a schematic cross sectional view of an example of an optically assisted magnetic recording head, according to one embodiment, is shown. The optically assisted magnetic recording head shown in FIG. 1 is composed of a single-pole-type head and a near-field light generating element. FIG. 2 is a schematic diagram when viewed from an air bearing surface (ABS), according to one embodiment. FIG. 1 also shows a cross section of a part of a magnetic disk. The magnetic disk 30 is a perpendicular magnetic recording disk having a substrate 31, a soft magnetic backing layer 32 and a perpendicular magnetic recording film 33. The soft magnetic backing layer 32 is located on the substrate 31. The perpendicular magnetic recording film 33 is located on the soft magnetic backing layer 32.

The optically assisted magnetic recording head has a slider 10. The slider 10 moves above the magnetic disk 30. The slider 10 includes a recording pole (main pole) 11, the near-field light generating element 23 and a magnetic reproducing element 15. The main pole 11 is adapted to apply a recording magnetic field to the magnetic disk 30. The near-field light generating element 23 generates near-field light. The magnetic reproducing element 15 is adapted to reproduce a mark recorded on the magnetic disk 30. The magnetic reproducing element 15 is a giant magneto resistive (GMR) element or a tunneling magneto resistive (TMR) element. The magnetic reproducing element 15 is located between a pair of magnetic shields 16. Each of the magnetic shields 16 is adapted to shield a magnetic field that will flow from the periphery of the magnetic reproducing element 15. The recording magnetic field is generated using a thin film coil 12. The generated magnetic field flows from the main pole 11 through the magnetic recording layer 33 and the soft magnetic backing layer 32 of the magnetic disc 30 and returns to an auxiliary pole 13.

A magnetic film 14 may be arranged on a trailing side of the main pole 11 and on both sides of the main pole 11 in a track width direction in order to increase the gradient of the magnetic field. The near-field light generating element 23 adapted to generate near-field light is formed in a region of the ABS of the slider 10. The region of the ABS of the slider 10 is adjacent to the main pole 11. A waveguide 20 is in contact with the near-field light generating element 23 and positioned. The waveguide 20 extends to an upper portion of the slider 10. The waveguide 20 has a core 21 and a clad 22. The clad 22 surrounds the core 21. As schematically illustrated in FIG. 2 and described later, the near-field light generating element 23 has a C-shaped structure surrounding a part of the core 21 of the waveguide 20.

A semiconductor laser (not shown) emits laser light 25. The laser light 25 then passes through a waveguide 26 and is introduced to the upper portion of the slider 10. The light output from the waveguide 26 is converted into parallel light by a collimated lens 27. The parallel light is reflected onto a mirror 28. A focusing lens 29 causes the laser light to be incident on the waveguide 20. The waveguide 20 has the near-field light generating element 23 at its edge portion. The laser light passes through the waveguide 20 and is incident on the near-field light generating element 23 at the edge of the waveguide 20. Then, near-field light is generated from the near-field light generating element 23 and spreads at a small angle. The magnetic recording layer 33 of the magnetic disk 30 is heated by the near-field light. When the magnetic recording layer 33 is heated, the recording magnetic field generated from the main pole 11 is simultaneously applied to a recording region of the heated magnetic recording layer 33 to ensure that data is magnetically recorded. The magnetic disk 30 moves to the right side (indicated by an arrow) of FIG. 1 with respect to the slider 10. The near-field light generating element 23 is present in the slider 10 and on a leading side of the main pole 11 that generates the recording magnetic field.

Figure 3:
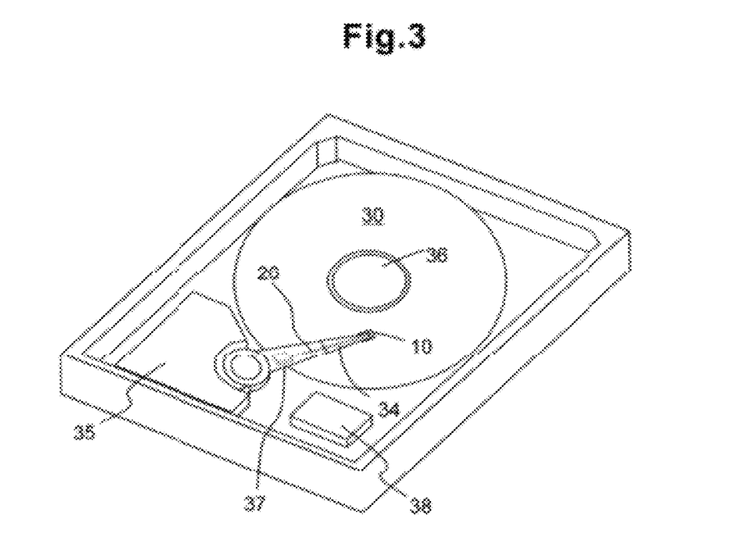
FIG. 3 is a diagram showing an example of a magnetic recording device having the optically assisted magnetic recording head according to one embodiment.

FIG. 3 shows an example of the configuration of a magnetic recording device having the optically assisted magnetic recording head, according to one embodiment. The slider 10 having the optically assisted magnetic recording head according to one embodiment of the present invention is fixed to a suspension 34. The slider 10 is moved to a location above a desirable track of the magnetic disk 30 by a voice coil motor 35. The slider 10 has a pad formed on the ABS and designed for floating. The slider 10 floats and moves above the magnetic disk 30 under the condition that a distance between the ABS of the slider 10 and the surface of the magnetic disk 30 is 10 nanometers or less. The magnetic disk 30 is fixed to a spindle 36 and rotates. The spindle 36 is rotated by a motor. To record data, current flows in the coil 12 provided in the optically assisted magnetic recording head, the main pole 11 generates a recording magnetic field, and the semiconductor laser emits laser light to form a recording mark in the magnetic recording layer of the magnetic disk 30. The semiconductor laser is placed in a thin package 37. The thin package 37 is located at a base of the suspension. The laser light is guided between the semiconductor laser and the slider by the waveguide 26. The magnetic reproducing element 15 is used for data reproduction. The magnetic reproducing element 15 is placed in the slider. A reproduction signal is processed by a signal processing LSI 38.

FIGS. 4(a) to 4(d) are outline diagrams showing a method for forming the waveguide and the near-field light generating element in the slider, according to some embodiments. Each of the diagrams shown on the left sides of FIGS. 4(a) to 4(d) is a schematic end view of an element when viewed from the side of the ABS of the element, according to one embodiment. Each of the diagrams shown on the right sides of FIGS. 4(a) to 4(d) is a schematic plan view of the element, according to one embodiment. The waveguide 20 is formed on a reproducing head. Since the present embodiments are not characterized by a process for forming the reproducing head, the process for forming the reproducing head is not described herein.

Figure 4:
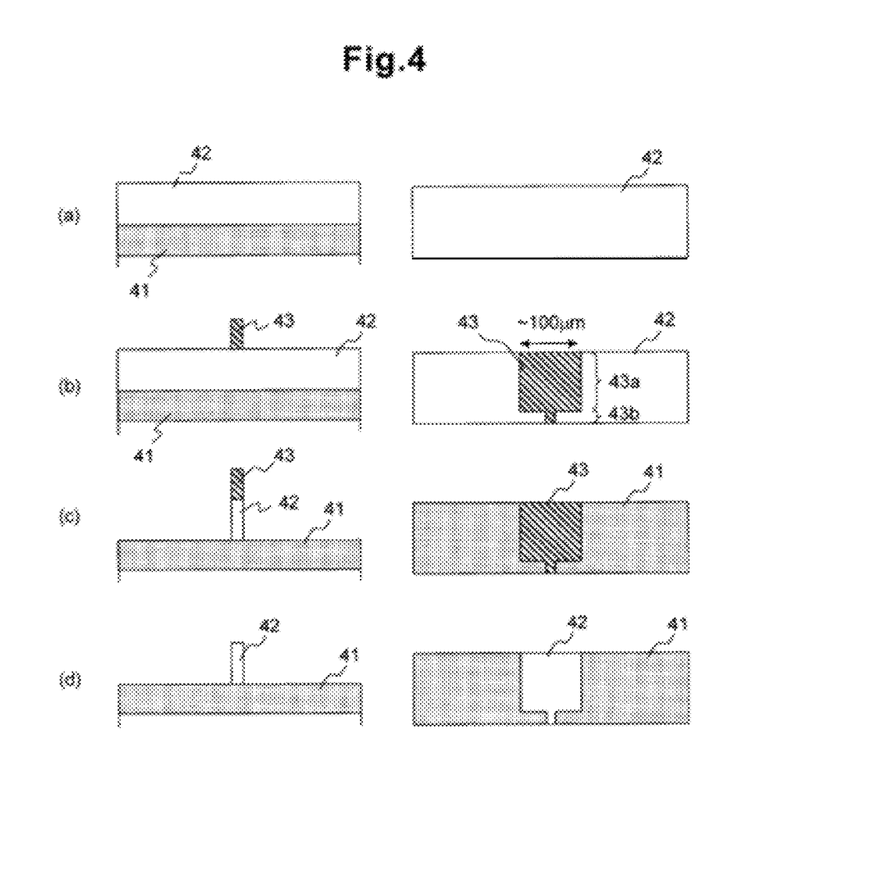
Figure 5:
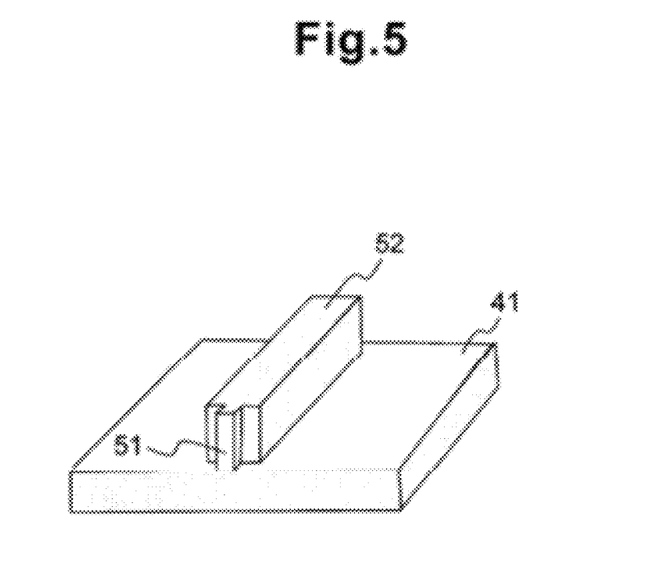
FIG. 5 is a diagram showing an edge of a core, according to one embodiment.

Referring to FIG. 4(a), after the formation of the reproducing head, a first inorganic insulating film 41 is formed by a sputtering method, a CVD method, or the like. The first inorganic insulating film 41 serves as the clad of the waveguide 20. The first inorganic insulating film 41 has a low refractive index and is made of $Al_2O_3$, $SiO_2$ or the like. The first inorganic insulating film 41 has a thickness of approximately 1 µm. A second inorganic insulating film 42 is formed on the first inorganic insulating film 41 by a sputtering method, a CVD method or the like. The second inorganic insulating film 42 serves as the core of the waveguide 20. The second inorganic insulating film 42 has a high refractive index and is made of $Ta_2O_5$ or the like. The second inorganic insulating film 42 has a thickness of 1 µm to 2 µm. After the formation of the second inorganic insulating film 42, a resist pattern 43 is formed to pattern the second inorganic insulating film 42 as shown in FIG. 4(b). The resist pattern 43 has a portion 43a and a thin portion 43b as shown in the diagram on the right side of the FIG. 4(b). The resist pattern portion 43a has a width of approximately 100 µm and is used for formation of the core. The resist pattern portion 43b has a width of approximately 100 nanometers to 200 nanometers and is connected to the side of the ABS of the resist pattern portion 43a. Next, the second inorganic insulating film is etched by RIE using the resist pattern 43 as a mask to expose the first inorganic insulating film 41, as shown in FIG. 4(c). After that, the resist pattern 43 is removed as shown in FIG. 4(d). As a result, the core 52 is formed as shown in FIG. 5. The core 52 has a thin protrusion 51 at a central portion of its edge. The protrusion 51 extends in a top-bottom direction.

Figure 6:
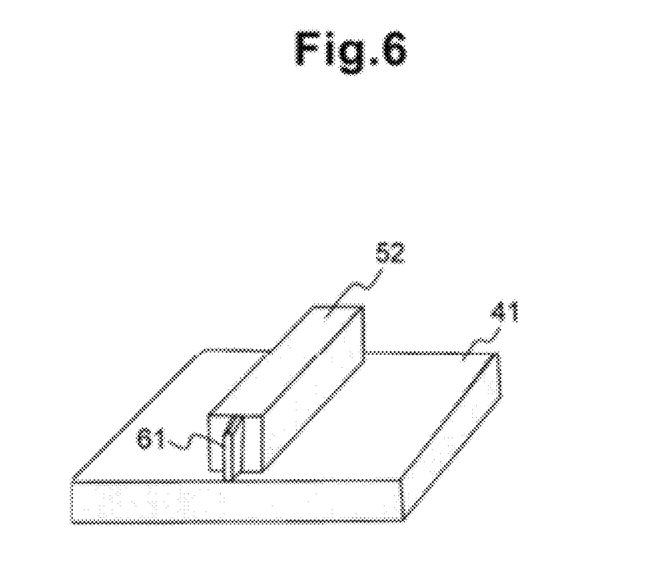
FIG. 6 is a diagram showing an edge of a core, according to one embodiment.

Next, the protrusion 51 is etched by ion milling using an Ar ion to reduce the width of the protrusion 51. It is preferable that an angle of incidence of the Ar ion used for the ion milling be in a range of approximately 40° to 60°. This angle results in a large milling rate of $Al_2O_3$ and $SiO_2$. In the ion milling process, left and right edges of an upper portion of the protrusion are quickly etched. Thus, the width of the upper portion of the protrusion becomes equal to or less than 20 nanometers and small. The widths of all portions of the protrusion become equal to or less than 50 nanometers and small. Thus, the protrusion can be processed to ensure that the protrusion has dimensions equal to or less than limit values for normal lithography. FIG. 6 is a schematic diagram showing a structure formed by a slimming process using ion milling, according to one embodiment. The core 52 has a plate-shaped portion 61 at its edge on the side of the ABS. The width of a lower portion of the plate-shaped portion 61 is not larger than about 100 nanometers, while the width of an upper portion of the plate-shaped portion 61 is not larger than about 20 nanometers, according to some embodiments. The upper portion of the plate-shaped portion 61 is pointed. The plate-shaped portion 61 extends in a top-bottom direction and has a small width.

Next, an upper portion and side surfaces of the plate-shaped portion 61 formed at the edge of the core and having the small width is plated with Au. The Au plating thin film serves as the near-field light generating element 23. In this case, an electro lapping guide (ELG) film is simultaneously formed in an ELG area of a wafer in order to process the ABS with high accuracy in a post-process. A nonmagnetic metal, such as Pt, Ag, Cu, and Al, may be used as the plating metal instead of Au.

FIGS. 7(a) to 7(f) are schematic diagrams showing a process for forming the plating film, according to one embodiment. Each of the diagrams on the left sides of FIGS. 7(a) to 7(f) is a schematic end view of the element. Each of the diagrams on the centers of FIGS. 7(a) to 7(f) is a plan view of the element. Each of the diagrams on the right sides of the FIGS. 7(a) to 7(f) shows the ELG area.

Figure 7:
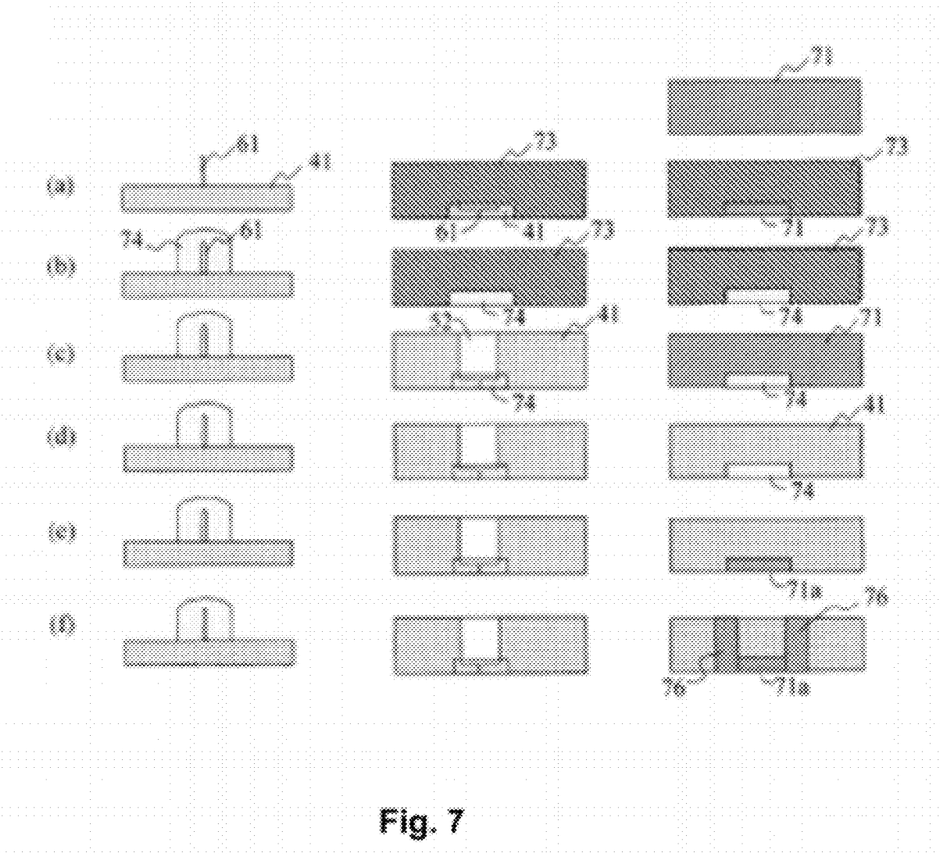

A metal film (Cr, NiFe, Ta, NiCr or the like) is formed as the ELG film 71 in the ELG area of the wafer. In this case, the metal film may be formed by a liftoff method in an area in which the ELG is formed. Next, the first inorganic insulating film 41 and a resist frame 73 for plating are formed, while the plate-shaped portion 61 (provided at the edge of the core and having the small width) remains, as shown in FIG. 7(a). In this case, the resist frame 73 is formed on the core. The resist frame 73 is also formed in the ELG area. In this process, a single photomask is used to form a core pattern and an ELG pattern as resist patterns. Thus, the relative positions of the core pattern and ELG pattern can be controlled with high accuracy. Next, an Au plating film 74 is formed as shown in FIG. 7(b). The Au plating film 74 is formed in the ELG area. Next, the resist frame is removed as shown in FIG. 7(c). In this way, the upper portion and side surfaces of the plate-shaped portion 61 (provided at the edge of the waveguide core 52 and having the small width) are plated with the Au film 73. The upper portion of the plate-shaped portion 61 is pointed. The Au film 74 serves as the C-shaped near-field light generating element having a narrowed portion. The pointed upper portion of the plate-shaped portion 61 is surrounded by the narrowed portion of the C-shaped Au film 74. The near-field light having a high intensity is generated from the narrowed portion by irradiation with the laser light. In this process, the ELG film 71 is exposed to the ELG area.

Next, the ELG film is milled using the plating film as a mask to expose the underlying first inorganic insulating film 41 in the ELG area as shown in FIG. 7(d). Before the milling, a resist pattern is formed on the core to suppress damage due to the milling. After that, the plating film present in the ELG area is removed to expose the underlying ELG film 71a as shown in FIG. 7(e). An electrode 76 for the ELG is formed as shown in FIG. 7(f). For example, when a liftoff method is used as a method for forming the electrode 76, the liftoff method can prevent the core from being damaged.

After that, the inorganic insulating film is formed and covers the side surfaces and upper surface of the core. The inorganic insulating film serves as the clad. The inorganic insulating film has a low refractive index and is made of $Al_2O_3$, $SiO_2$ or the like. The inorganic insulating film is planarized. In this way, the waveguide 20 having the near-field light generating element 23 at its edge is completely formed. A recording head is formed on the waveguide 20. Any type of recording head may be used, and one skilled in the art will appreciate that known methods may be used to fabricate the recording head.

Figure 8:
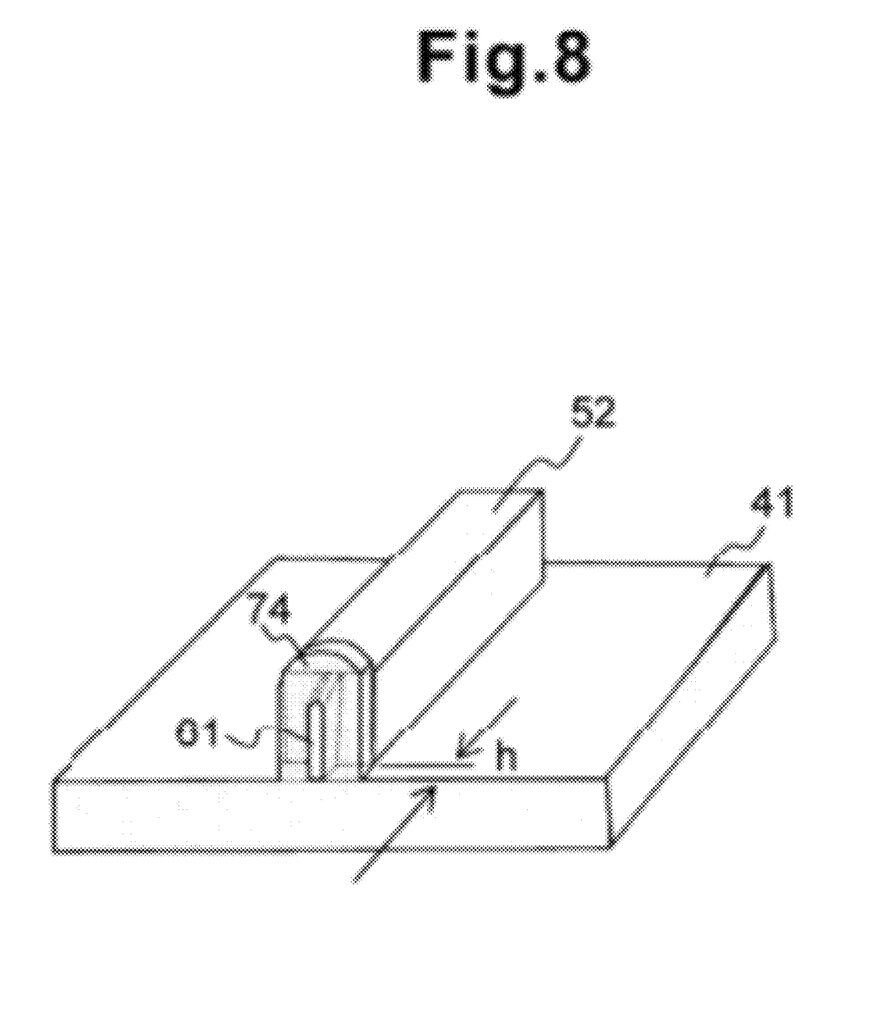
FIG. 8 is a diagram showing the state of a core of a waveguide and the state of an Au film after polishing of an air bearing surface, according to one embodiment.

After that, the element is polished from the ABS to set the height of the near-field light generating element from an ABS of the near-field light generating element to be 50 nanometers or less. In this case, electric resistance of the ELG film 71a formed in the ELG area is monitored. When the electric resistance of the ELG film 71a becomes equal to a preset value, the polishing is stopped to adjust the height of the near-field light generating element with high accuracy. FIG. 8 shows the core 52 of the waveguide and the Au film 74 after the polishing of the ABS. In FIG. 8, the clad formed on the upper portion and side surfaces of the core 52 is not illustrated for clarity of the diagram. In the present embodiment, the height h of the near-field light generating element from the ABS is 50 nanometers or less and small.

As apparent from the aforementioned manufacturing process, according to one embodiment, the Au plating film 74, or the near-field light generating element is automatically positioned and formed at the edge of the waveguide core which introduces the laser light and covers the entire end surface of the waveguide core. Thus, the laser light passing through the waveguide reaches the near-field light generating element without a loss, and the near-field light is efficiently generated.

Figure 9:
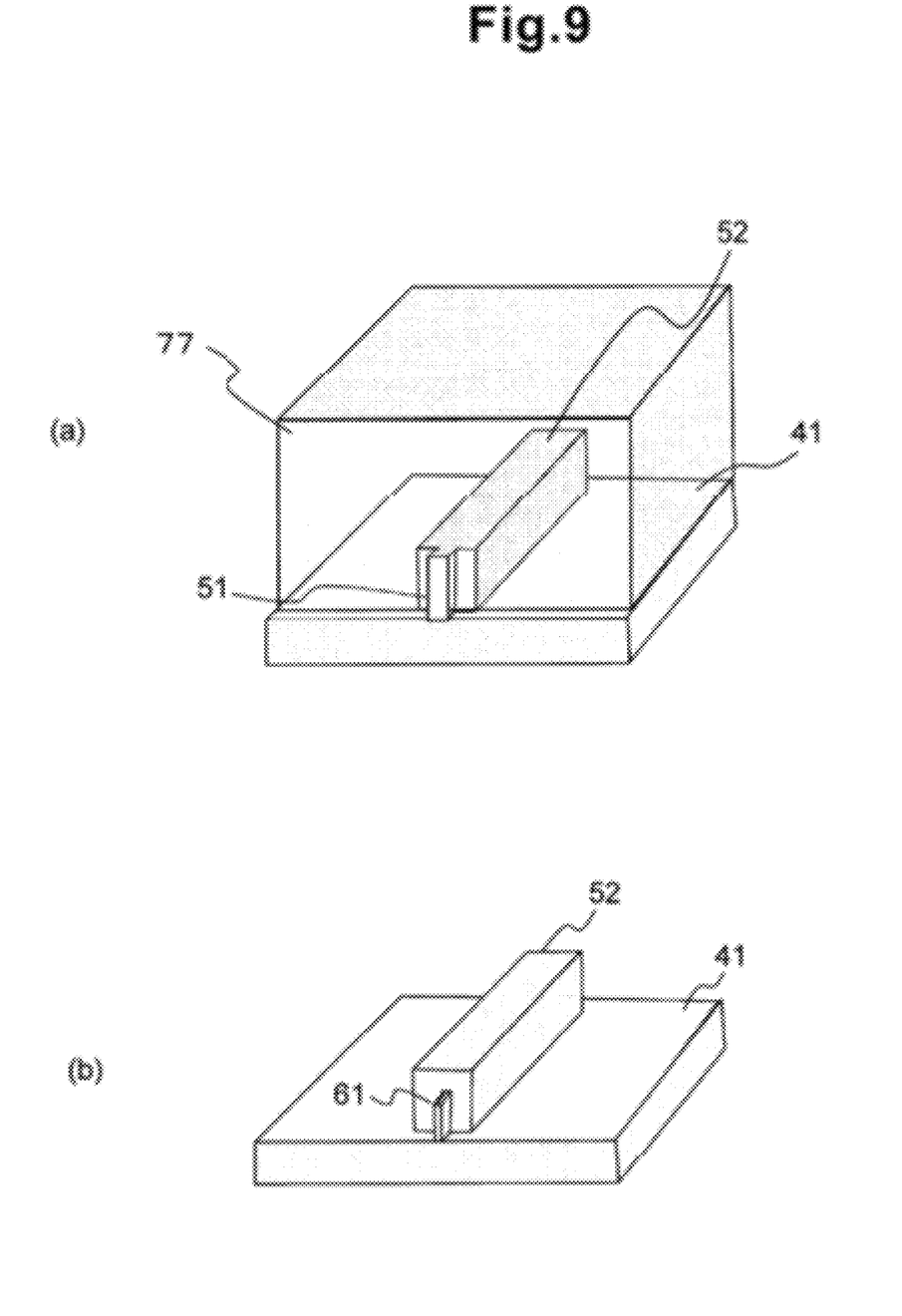
FIGS. 9(a) and 9(b) are diagrams showing the shape of another edge of the core according to one embodiment and a method for forming the edge.

FIGS. 9(a) and 9(b) illustrate an example of the shape of another core according to one embodiment and an example of a method for forming the core, according to one embodiment. FIG. 9(a) shows the state in which a resist pattern is formed on a wide portion of the core after the process shown in FIG. 4(c). FIG. 9(b) shows a structure obtained after etching, i.e., ion milling (ion incident angle of 55°) to narrow the edge of the core in a similar manner to the process shown in FIG. 4(b). Since the wide portion of the core is protected by the resist pattern, only the thickness of the edge of the core is reduced. Thus, a plate-shaped portion 61 having a shape shown in FIG. 9(b) can be obtained. When a plating film made of Au or the like is formed around the plate-shaped portion 61 by the process shown in FIGS. 7(a) to 7(f), the amount of light incident on the near-field light generating element can be increased.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An optically assisted magnetic recording head comprising:
   a recording pole for producing a recording magnetic field; and
   a near-field light generating device having a waveguide and a thin metal film,
   wherein the waveguide has a core and a clad at least partially surrounding the core,
   wherein the core has a plate-shaped portion having a small width which protrudes from an edge of the core, the edge being located on an air bearing surface side of the core, and
   wherein the thin metal film is located on an upper portion and on side portions of the plate-shaped portion such that the thin metal film covers the edge of the core at the air bearing surface side.

2. The optically assisted magnetic recording head according to claim 1, wherein the thin metal film is located on a leading side of the recording pole.

3. The optically assisted magnetic recording head according to claim 1, wherein the portion of the plate-shaped portion having a small width is pointed.

4. The optically assisted magnetic recording head according to claim 3, wherein the thin metal film is located on a leading side of the recording pole.

5. The optically assisted magnetic recording head according to claim 1, wherein the thin metal film has a C shape.

6. A system, comprising:
   a magnetic recording medium;

at least one optically assisted magnetic recording head as recited in claim 1 for reading from and/or writing to the magnetic recording medium; and a control unit coupled to the optically assisted magnetic recording head for controlling operation of the optically assisted magnetic recording head.

7. A magnetic recording and reproducing device comprising:

a magnetic recording medium;

a medium driver for driving the magnetic recording medium;

at least one magnetic head having a recording head and a reproducing head; and a head driver for moving the at least one magnetic head to a position above the magnetic recording medium;

wherein the magnetic recording medium is a perpendicular magnetic recording medium having a soft magnetic backing layer and a perpendicular magnetic recording film, wherein the recording head has a near-field light generating device and a recording pole for producing a recording magnetic field, wherein the near-field light generating device has a waveguide and a thin metal film, the waveguide having a waveguide core and a waveguide clad at least partially surrounding the waveguide core, wherein the waveguide core has a plate-shaped portion protruding from an edge of the waveguide core having a small width, the edge being located on an air bearing surface side, and wherein the thin metal film is provided on an upper portion and side portions of the plate-shaped portion such that the thin metal film covers the edge of the waveguide core at the air bearing surface side.

8. The magnetic recording and reproducing device according to claim 7, wherein the thin metal film has a C shape.

9. The magnetic recording and reproducing device according to claim 8, wherein the plate-shaped portion is positioned in an interior of the C shape of the thin metal film.

10. The magnetic recording and reproducing device according to claim 7, wherein the thin metal film extends along the plate-shaped portion between the edge on the air bearing surface side of the core and an air bearing surface of the head.

11. The optically assisted magnetic recording head according to claim 1, wherein the thin metal film extends along the plate-shaped portion between the edge on the air bearing surface side of the core and an air bearing surface of the head.

12. The optically assisted magnetic recording head according to claim 5, wherein the plate-shaped portion is positioned in an interior of the C shape of the thin metal film.

* * * * *